US006512840B1

(12) United States Patent
Tognazzini

(10) Patent No.: US 6,512,840 B1
(45) Date of Patent: Jan. 28, 2003

(54) DIGITAL ENCODING OF PERSONAL SIGNATURES

(75) Inventor: Bruce Tognazzini, Woodside, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 1083 days.

(21) Appl. No.: 08/655,135

(22) Filed: May 30, 1996

(51) Int. Cl.[7] .................................................. G06K 9/00
(52) U.S. Cl. ...................................... 382/119; 340/5.82
(58) Field of Search ................................ 382/100, 115, 382/116, 119–123; 178/18, 19, 18.01, 19.01; 235/379, 380; 345/173, 179, 182; 340/825.34, 5.81, 5.82

(56) References Cited

U.S. PATENT DOCUMENTS 5,479,530 A * 12/1995 Nair et al. .................. 382/119
5,544,255 A * 8/1996 Smithies et al. ............ 382/119
5,559,895 A * 9/1996 Lee et al. .................... 382/119
5,587,560 A * 12/1996 Crooks et al. .............. 382/119

* cited by examiner

*Primary Examiner*—Andrew W. Johns
(74) *Attorney, Agent, or Firm*—McDermott, Will & Emery

(57) ABSTRACT

The signature comparison process associated with bank approval processes is automated using signature capture devices and a stored database of valid signatures. A signature is captured as part of a normal credit transaction, digitized and compared with entries in a database of known valid signatures. In an automated gas pump environment, the signature is captured, compared and approved before any gas is dispensed.

5 Claims, 7 Drawing Sheets

DIGITAL ENCODING OF PERSONAL SIGNATURES

BACKGROUND OF THE INVENTION

1. Field of the Invention

The invention relates to the field of computerized credit approval, and, more particularly, to digital signature comparison techniques for ensuring that a card user is authorized.

2. Description of Related Art

When a credit card holder receives a new credit card, he is requested to sign the back of the card. The purpose of this visible signature is to permit a comparison to be made with the signature of a person who presents the card in payment for goods or services. If the signature on the credit card invoice matches that on the card, the presenter of the card is presumed to be authorized to use the card. A variety of other types of cards are treated similarly and will also be referred to as "credit cards" for convenience even though the descriptor "credit" may not be entirely accurate.

In some business establishments, such as a restaurant, when a customer signs a credit card receipt, the waiter will take the card and the receipt to a cashier who performs an independent comparison of the signature on the card with the signature on the receipt.

In other business establishments, a customer is requested to sign a blank piece of paper. The signed blank paper and the card are then taken to a cashier who runs the card through a card reader, and compares the card signature with the signature on the blank paper. If the two match, the authorized credit slip is taken back to the card holder for signature without further comparison.

The way in which credit cards are handled, as just described, presents two problems. The most serious problem is that signature comparison often does not occur. The second problem is that the user must wait while a signature comparison process is undertaken.

With the advent of automated fuel pumps, any pretense of signature comparison has been given up and no attempt is made whatever to ensure that the person presenting the card for gasoline is an authorized holder of the card. This presents a problem that losses are higher than would be expected if a presenter of card anticipated at least a nominal check of signature for authenticity.

There is thus a need for improving the signature comparison process to eliminate obviously unauthorized holders of credit cards and other authorizing cards.

SUMMARY OF THE INVENTION

The present invention provides apparatus, methods, systems and processes for capturing signatures and for comparing signatures with authorized exemplars to ensure that a card holder is authorized to use the card. This is accomplished by capturing in digitized form a signature of a customer presenting a credit card and by submitting that signature either to the credit card company who issued the card or to a signature service where an automatic comparison will be made of the similarities between the signature of the person presenting the card and an authorized holder of the card.

The invention relates to a system for comparison of a signature with an authorized signature. The system uses a portable device having a docking port and containing a signature pad for capturing an electronic replica of a signature. The portable device docks with a computer which has a docking port for receiving the portable device and which is configured for downloading the electronic replica from the portable device and for sending that replica to a central computer over a network for comparison with an authorized signature.

The invention also relates to a system for processing payment information having a signature. A plurality of merchant terminals are connected to a network, for obtaining approval of payment information. The payment information includes a payment card number and an electronic replica of a signature. A central computer is also connected to the network and has a database of electronic replicas of respective authorized signatures. The central computer is configured to compare an electronic replica of a signature with authorized signatures for the payment card number and to approve payment when replicas of signatures match by more than a threshold amount. Merchant terminals may include a gas pump equipped with a signature pad.

The invention is also directed to apparatus for processing payment information which includes a central computer having a database of signatures accessible by a card number for which a particular signature is authorized. The computer has a receiver for receiving an electronic replica of a signature and a card number, an access mechanism for retrieving one or more authorized signatures for a received card number, a signature comparator for comparing a received electronic replica of a signature with the one or more authorized signatures for a received card number, and a transmitter for authorizing payment when the signature comparator indicates that the received signature matches an authorized signature for the received card number.

The invention is also directed to terminal apparatus for processing payment information including a transmitter for sending an electronic replica of a signature and a card number to a central computer, a receiver for receiving payment information from the central computer, and a docking port for receiving an electronic replica of a signature from a portable device and for sending it to the transmitter.

The invention is also directed to vending apparatus for processing payment information including a signature pad for capturing an electronic replica of a signature, a card reader, a transmitter for sending an electronic replica of a signature from the signature pad and a card number from the reader to a central computer, and a receiver for receiving payment information from the central computer.

The invention is also directed to a method of comparing signatures. A signature is captured in electronic form and sent to a central computer with a card number. It is there compared with stored replicas of authorized signatures for the card number. The signature may be captured in electronic form on a portable device and then the portable device is docked with a merchant computer and downloading the signature to the merchant computer.

The invention is also directed to a method of processing payment information having a signature by storing a plurality of electronic replicas of authorized signatures, receiving payment information including a payment card number and an electronic replica of a signature, comparing an electronic replica of a signature with authorized signatures for the payment card number and approving payment when replicas of signatures match by more than a threshold amount.

The invention is also directed to a method of obtaining payment information for vending apparatus by providing a signature pad on the vending apparatus and capturing an electronic replica of a signature using that pad. The electronic replica and the card number are sent to a central computer, and payment information is received from the central computer.

The invention is also directed to computer program products, each including one or more memory media, and a computer program stored on the one or more memory media. The computer programs stored on the memory media implement the apparatus, systems and methods described above. The memory media may also include a database of authorized signatures stored thereon.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
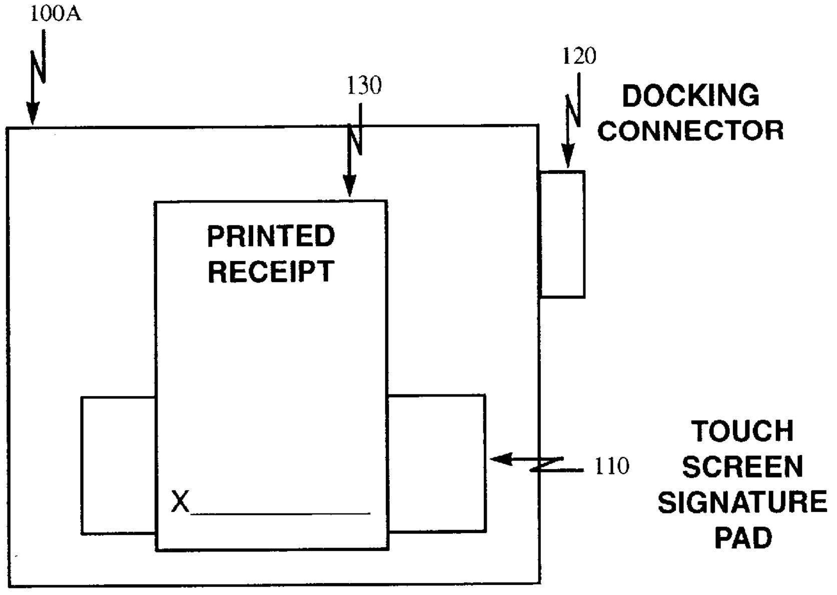
FIGS. 1A and 1B illustrates respective embodiments of a signature capture device.
Figure 1B:
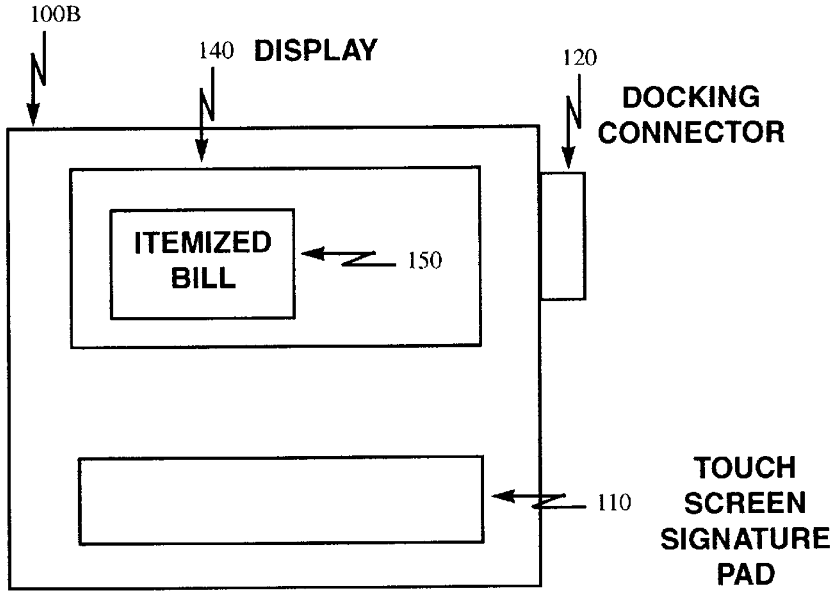

FIGS. 1A and 1B illustrate respective embodiments of a signature capture device. In FIG. 1A, a signature capture device 100A includes a touch screen signature pad 110 on which a printed receipt 130 is overlaid for signature. When the customer signs at a point indicated by X on the drawing, the pressure from the signature results in capturing a bit map of the signature utilizing the touch screen signature pad 110 located below the printed receipt. The captured signature can then be uploaded through a docking connector 120 to a master station for processing.

Signature capture device 100B is similar to 100A discussed above except that in lieu of a printed receipt 130, an itemized bill 150 is shown on a display screen 140. The touch screen area 110 serves as a signature pad for capturing a bit map of a user's signature. In the approach shown in FIG. 1B, no actual writing occurs; however, as the user presses on the touch screen display, the location of the pressure points are detected and the pixels underneath the pressure points are illuminated, thus replicating the process by which a pencil writes on a paper.

Figure 2:
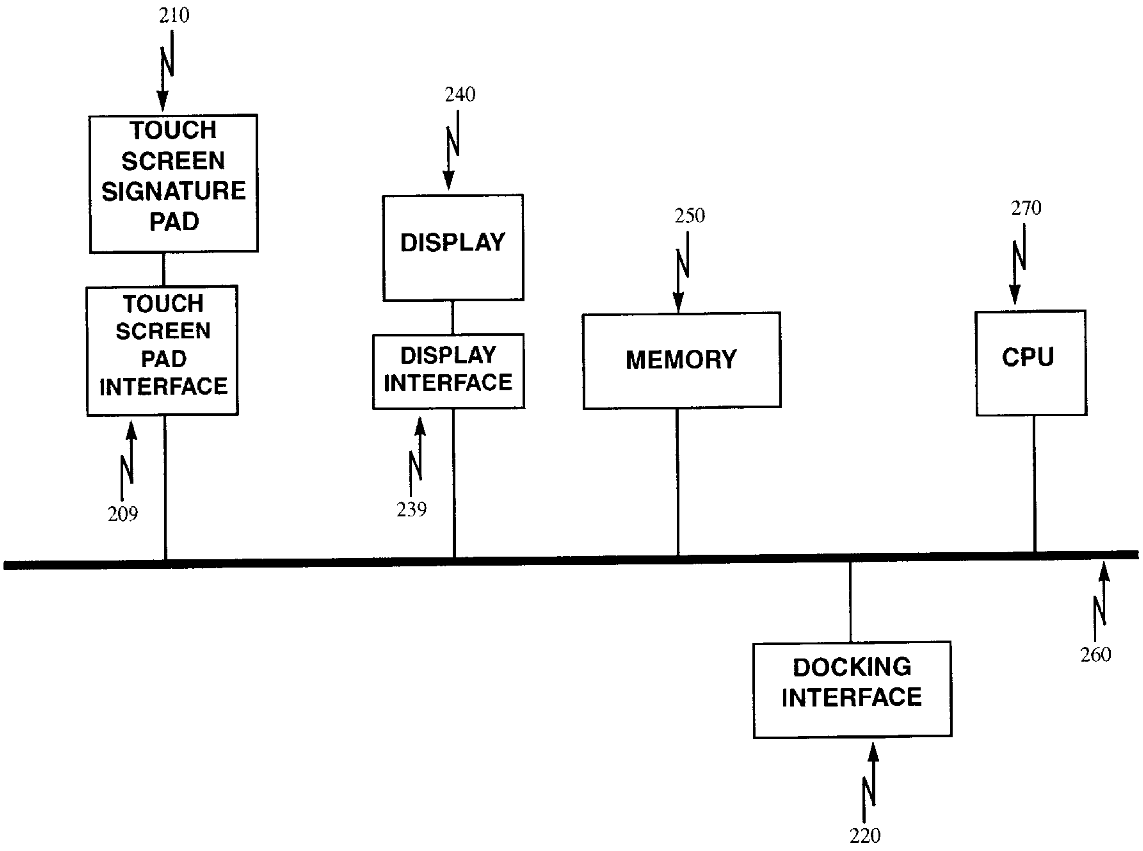
FIG. 2 illustrates is a block diagram of the construction of a signature capture device.

FIG. 2 is a block diagram of the construction of the signature capture devices of FIGS. 1A and 1B. As shown in FIG. 2, CPU 270 controls the capture and storage of signatures and their display. It also controls the transfer of a captured signature over the docking interface 220 to a master station. The CPU has access to all other devices over bus 260. Memory 250 stores programs and data which the CPU uses in carrying out its functions. Touch screen signature pad 210 is used as an input/output device and is connected to the bus over touch screen pad interface 209. Display 240 is also connected to the bus over display interface 239. Display 240 is optional and is utilized with the embodiment shown in FIG. 1B. It is not required for the embodiment shown in FIG. 1A.

In operation, a user signs his touch screen signature pad 210 or a receipt positioned on the pad and a copy of that signature is captured and stored in memory 250. It is simultaneously displayed on the touch screen signature pad 210. When the signature capture device is docked, the stored signature is transferred over docking interface 220 to a master station for processing as discussed more hereinafter. If a paper receipt is not utilized, display 240 will display the itemized bill for the user's signature. The user then signs using touch screen signature pad 210 as before.

Figure 3:
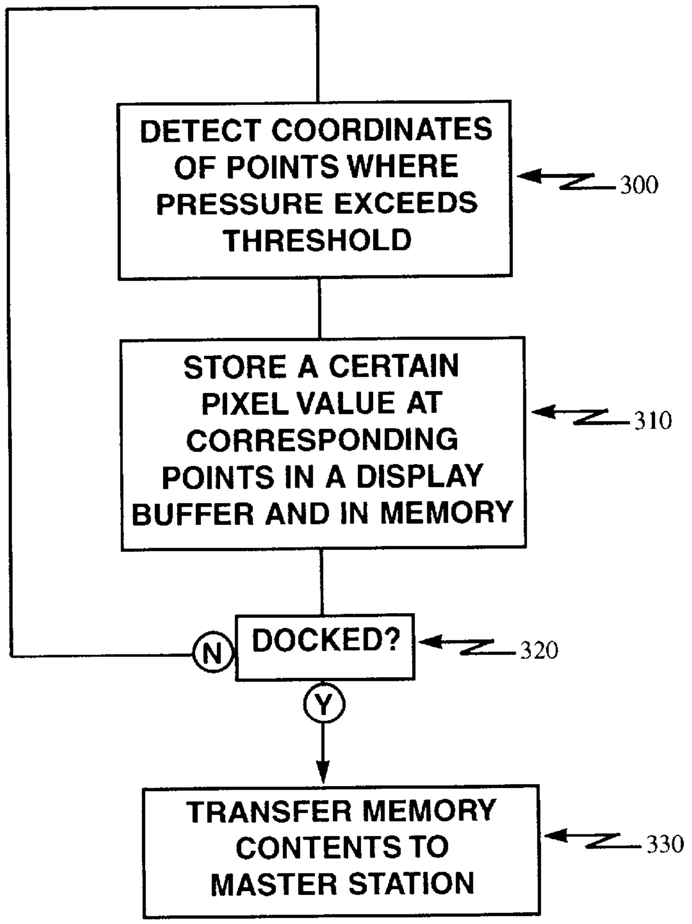
FIG. 3 is a flow chart of how a signature is captured in a signature capture device and uploaded to a master station.

FIG. 3 is a flow chart of how a signature is captured in a signature capture device and uploaded to a master station. The coordinates of points where pressure exceeds some threshold is detected on the touch screen surface (300) and the value of pixels is changed to a certain value (e.g. on or off) and stored at corresponding points such as in a display buffer and/or in memory. The display buffer thus effectively illuminates the pixels underneath the points at which pressure exceeds the threshold value, thus, tracing the image of the signature on the display screen in an analog to that which is done with a Magic Slate. When the device is docked (320), transfer of the stored signature occurs to the master station (330).

Figure 4:
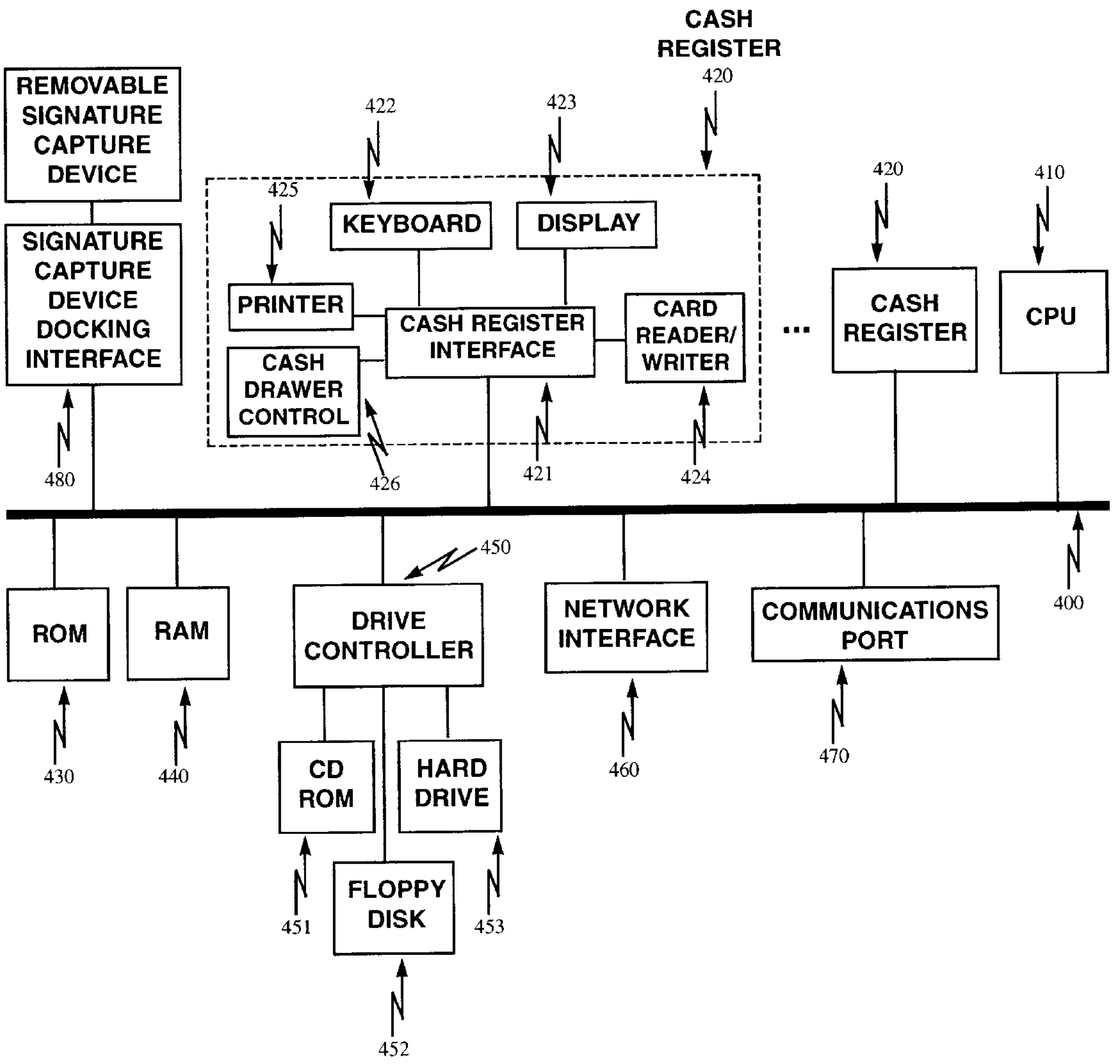
FIG. 4 is an exemplary hardware arrangement for carrying out the invention.

FIG. 4 is an exemplary hardware arrangement for carrying out the invention. FIG. 4 shows a plurality of cash registers 420 connected to a central processing unit 410 over a bus 400. A typical cash register is equipped with a keyboard 422 and a display 423. A card reader/writer 424 is used for reading credit cards and, in some embodiments, for writing smart card information. Printer 425 is utilized for generating paper receipts in the traditional manner. Control of a cash drawer is illustrated at 426 and all of these devices are interfaced to the computer bus over cash register interface 421.

Read only memory 430 contains, typically, boot strap routines and a basic input/output (BIOS) system utilized to initialize CPU 410 at start up. RAM 440 represents the main memory utilized for processing data. Drive controller 450 interfaces one or more disk type drives such as CD ROM 451, floppy disc drive 452 and hard discs 453. The number and type of drives utilized with a particular system will vary depending upon user requirements.

A network interface 460 permits communications to be sent to and received from a network. Communications port 470 may be used as an alternate means of communication or as a supplemental means of communication. That is, communications port 470 may be utilized for a dial-up connection to one or more networks whereas network interface 460 is a dedicated interface to a particular network.

Programs for controlling the operation of the apparatus shown in FIG. 4 are typically stored on a disc drive and then loaded into RAM for execution during the start-up of the computer.

A signature capture device docking interface 280 permits docking of the signature capture device disclosed in conjunction with FIG. 1A and FIG. 1B.

Figure 5:
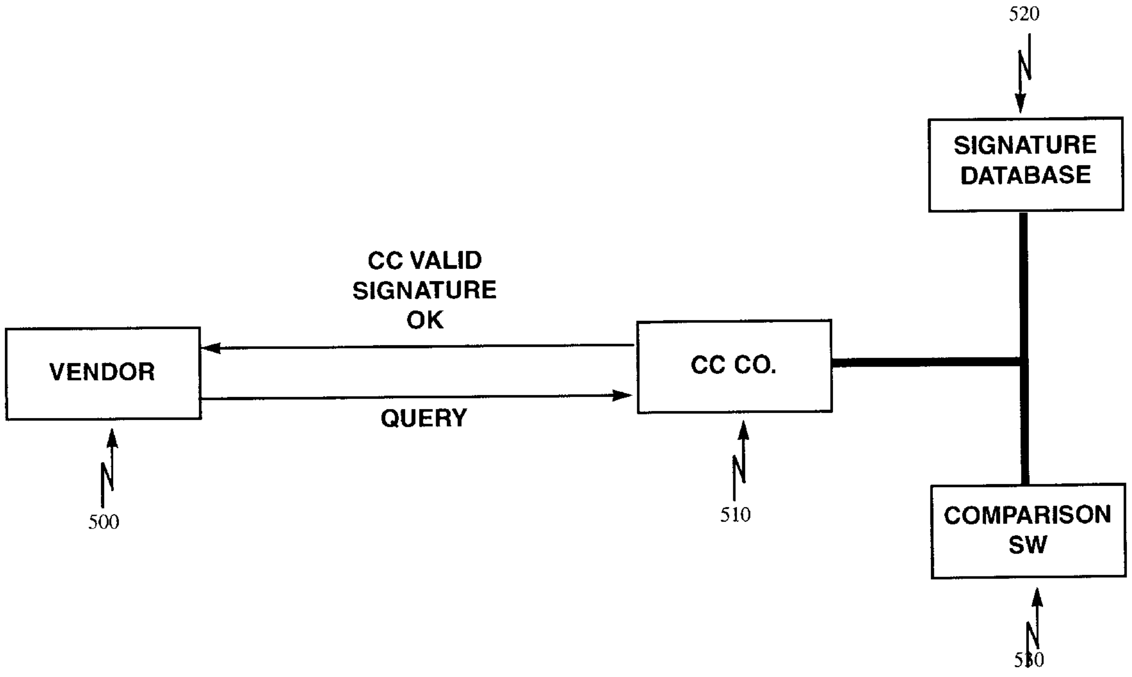
FIG. 5 is a diagram illustrating a credit card transaction and signature approval process.

FIG. 5 is a diagram illustrating a credit card and signature approval process. Vender 500 sends a copy of a signature captured using the signature capture device to an authorizing agency, such as a credit card company 510. The credit card company maintains a signature data base 520 of authorized signatures organized by, for example, credit card number. A copy of a known valid signature is retrieved from the signature data base and compared with the signatures sent from the vendor using comparison software 530. Comparison software can be either pattern matching or handwriting analysis software that is available in the art. The result of the comparison is a measure of the degree of similarity or, alternatively, a measure of the confidence that the two signatures were written by the same person. If the similarities are sufficiently high or if the confidence is sufficiently high, then one may conclude that the signature is from an authorized source and the credit card company can return an authorization to the vendor stating (1) that the credit card is valid and not indicated as stolen and (2) that the signature compares favorably with that known to be from an authorized user.

The signature data base 520 can be collected as part of the credit card application process by digitizing a signature on the application and can include the signatures of a number of authorized users for the credit card so the comparison with any one user's signature in a favorable way will result in authorization of the transaction.

Figure 6:
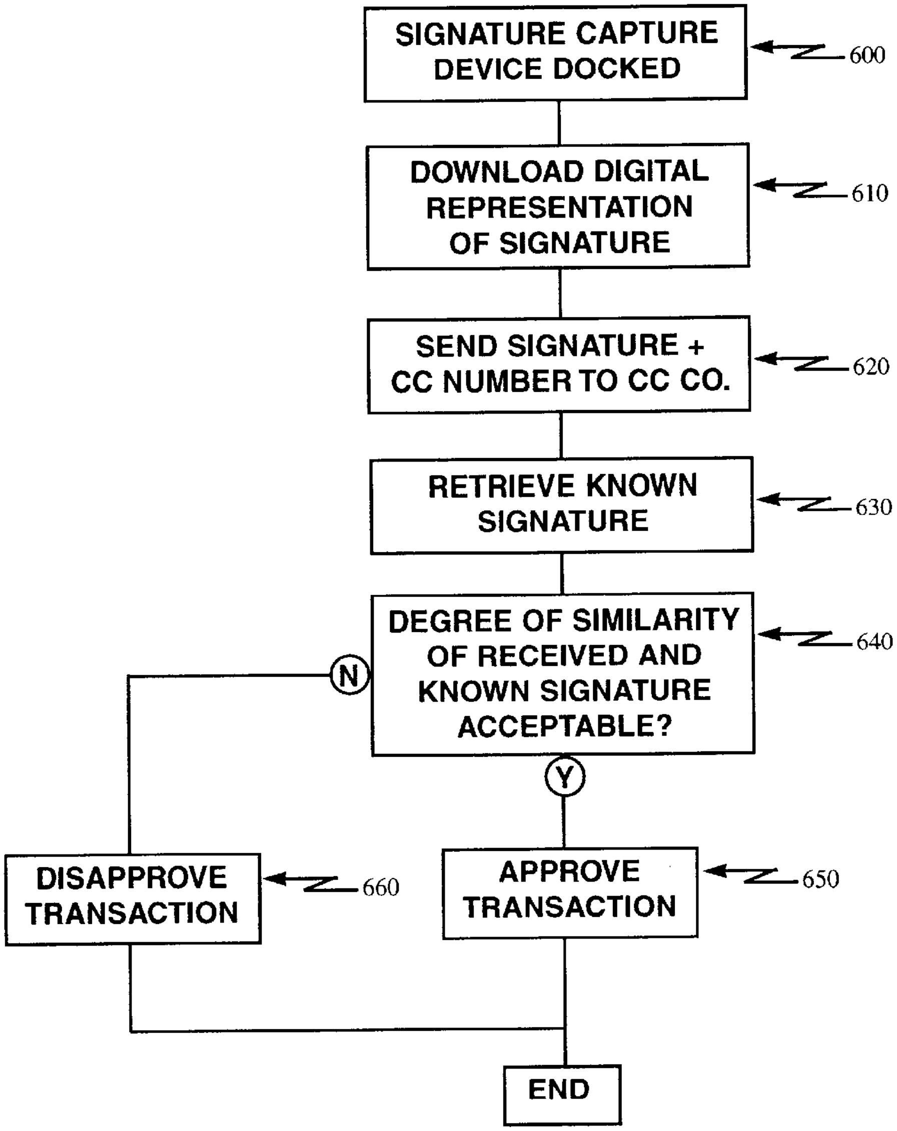
FIG. 6 is a flowchart of a signal approval process.
Figure 7:
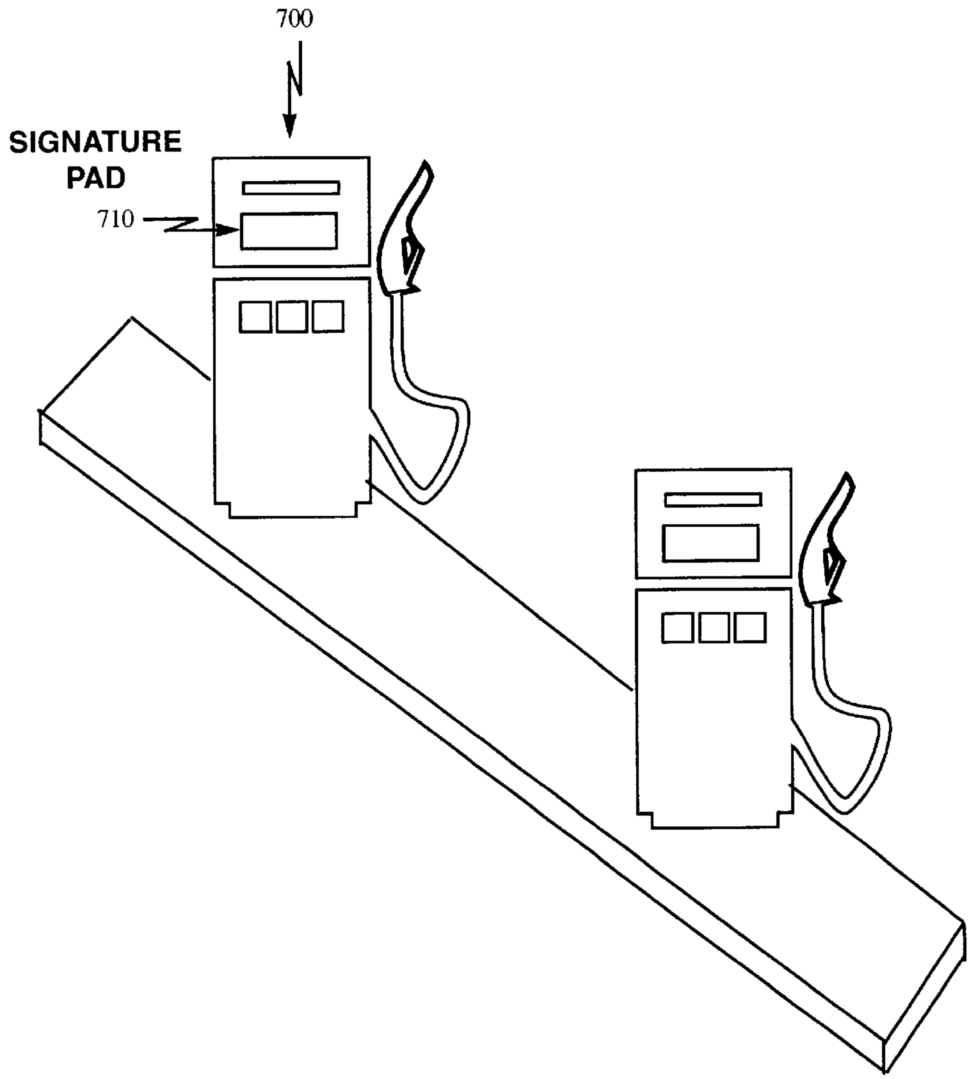
FIG. 7 illustrates an application of the signature approval process at an automated gas pump.

FIG. 6 is a flow chart of a signature approval process. When the signature capture device shown in FIG. 1A or 1B is docked in the master station (600) the digital representation of signature is downloaded from the capture device into the master station (610) from which it is sent to an authorizing agent, such as a credit card company, together with the account number (credit card number) for authorization (620). A copy of one or more known valid signatures for the account number is retrieved (630) and a comparison made between the received and known signatures to see if the degree of similarity is acceptable (640). If it is (640-Y) the transaction is approved (650). If it is not, (640-N) a transaction is affirmatively disapproved (660) and messages to that effect are sent to the vendor originating the query.

The invention is particularly useful in a context of automated gasoline pumps where, as discussed above, no signature comparison normally occurs. This can be remedied by including a touch screen signature capture device at the pump (700) and requesting that the person presenting the credit card to the pump for the purchase of gasoline sign the signature capture device (760). A digitized version of the signature can then be forwarded directly to the credit card company who could check both the credit card and the signature to ensure that the person presenting the card is an authorized holder.

There has thus been described techniques for ensuring signature comparison in ways which overcome the problems of the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A system for comparison of a signature with a stored copy of an authorized signature, comprising:

a. a network;

b. a central computer, connected to said network, having stored thereon a one or more electronic replicas of respective authorized signatures for at least one account and configured to compare signatures;

c. a portable device, having a docking port, containing a touch screen display for displaying information related to said account and serving as a signature pad for capturing an electronic replica of a signature; and d. a computer, having a docking port for receiving said portable device, configured for downloading a captured electronic replica of a signature from said portable device and for sending said electronic replica to said central computer over said network for comparison with an authorized signature.

2. A system for processing payment information having a signature, comprising:

a. a network;

b. a central computer, connected to said network, having stored thereon one or more electronic replicas of respective authorized signatures for at least one account and configured to compare signatures; and c. one or more merchant terminals, connected to the network, having a touch screen display for displaying information relating to said account and for capturing an electronic replica of a signature and for obtaining approval of payment information, said payment information including a payment card number;

in which said central computer compares a capture electronic replica of a signature with one or more stored authorized signatures for said payment card number and approves payment when replicas of signatures match by more than a threshold amount.

3. The system of claim 2 in which at least one of said merchant terminals is a gas pump equipped with a signature pad.

4. Vending apparatus for processing payment information comprising:

a. a touch screen signature pad for capturing an electronic replica of a signature and for displaying information about an account;

b. a card reader;

c. a transmitter for sending an electronic replica of a signature from said touch screen display and a card number from said reader to a central computer; and d. a receiver for receiving payment information from said central computer.

5. A method of comparing signatures, comprising the steps of:

a. providing an element for performing the step of capturing a signature in electronic form;

b. providing an element for performing the step of sending a replica of said signature to a central computer with a card number; and c. providing an element for performing the step of comparing said replica with stored replicas of authorized signatures for said card number in which the step of capturing a signature in electronic form includes the steps of:

providing an element for performing the step of capturing a signature in electronic form on a touch screen of a portable device, docking said portable device with a merchant computer and downloading the signature to the merchant computer.

* * * * *